UNITED STATES PATENT OFFICE.

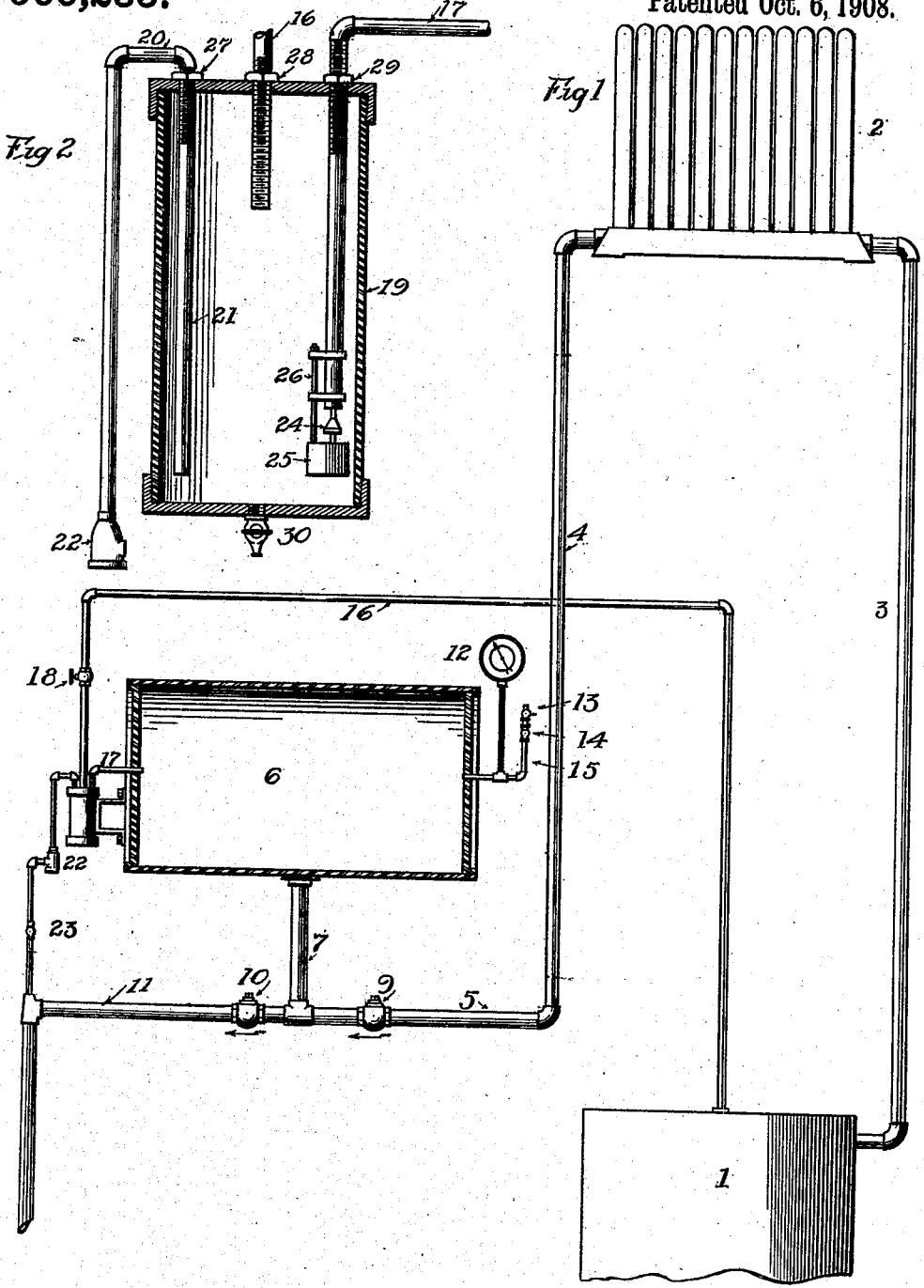

WALLACE E. TILLINGHAST, OF WORCESTER, MASSACHUSETTS.

VACUUM-GENERATING APPARATUS FOR STEAM-HEATING SYSTEMS.

No. 900,233.     Specification of Letters Patent.     Patented Oct. 6, 1908.

Application filed January 21, 1908. Serial No. 411,919.

*To all whom it may concern:*

Be it known that I, WALLACE E. TILLINGHAST, a citizen of the United States, and resident of Worcester, in the county of Worcester and State of Massachusetts, have invented an Improvement in Vacuum-Generating Apparatus for Steam-Heating Systems, of which the following description, in connection with the accompanying drawings, is a specification, like letters on the drawings representing like parts.

The purpose of the mechanism constituting my present invention is to create automatically a vacuum in such location and manner with relation to the steam heating system as positively to pull forward all water of condensation from the heating system, and hence continually to drain the entire heating system of all water of condensation and automatically compel the continuous operation of the steam heating system with the greatest efficiency.

In its preferred form, my invention entirely eliminates the loss of water from the heating system, maintains a continuous vacuum therein, permits the use of smaller piping throughout the entire installation than has hitherto been practicable, lowers the steam pressure required, permits the reduction in size of the radiators, and also of the boiler or steam generating device.

In the accompanying drawings, in which I have shown preferred embodiments of my invention, Figure 1 is a view in side elevation of the more complete form of the apparatus, showing the same to some extent diagrammatically; Fig. 2 is a vertical sectional view of a detail of the siphon valve.

The steam heating system may be of any kind desired, and accordingly I have herein simply indicated a gravity feeder or heater 1, radiator 2, steam supply pipe 3 and return pipe 4, my attachment or apparatus being connected to the return at any suitable point, herein shown as at 5. I run the boiler or heater at or below atmospheric pressure.

A vacuum tank 6 is connected by a pipe 7 to the main return pipe of the heating system at 8, check valves 9, 10 being interposed in the main return pipe, opening in the direction of the arrows, the outlet pipe 11 discharging back to the boiler or other receptacle in usual or preferred manner.

The vacuum tank in practice is usually suspended a few feet above the water line of the boiler or heater 6, and is provided with a combined steam and vacuum gage 12 and with a pet cock 13 for letting off the air from the tank 6 when desired, a vertical check valve 14 being interposed in the air pipe 15 opening toward the pet cock for permitting only the outward flow of air.

In the preferred or more complete form of my invention, as shown in Figs. 1 and 2, in which connections are provided for periodically producing a vacuum in the tank 6, the tank as shown is of sufficient capacity to hold at least a quarter of the cubical contents of the entire heating system, and is connected with the steam supply 1 by a pipe 16 opening at one end into the top of the boiler 1 and at the other end connecting by means of a pipe 17 with the interior of the tank 6, and controlled by a valve 18. To create a vacuum in the tank therefore, it is necessary to open the valve 18 and the pet cock 13 until the steam or vapor from the boiler expels all the air contained in the tank, whereupon the cock 13 and the valve 18 are closed, leaving the tank 6 full of hot steam or vapor, which, thereupon, immediately condenses by the radiation of its heat through the extensive walls of the tank, and this condensation of the steam in the tank 6 at once generates a vacuum, which draws on the return end 4 of the heating system, drawing the water of condensation therethrough into the tank 6.

The condensation of the steam in the tank 6 is almost instantaneous, and as the air and water from the heating system are drawn into the tank this vacuum is lowered until it reaches the zero point, whereupon the process is repeated, opening the steam valve 18 and the air valve 13 until finally after a series of repetitions all the air is completely expelled from the steam heating system. As soon as this point is reached the operation of the apparatus will thereafter be automatic, the water of condensation from the main return 4 flowing into the tank 6 past the check valve 9 and rising in the tank to a height sufficient to break the vacuum therein, more or less vapor returning with the condensation, owing to the fact that the condensation is returned at the moment of liquefaction, and this vapor serves to break the vacuum in the tank, allowing the water thereupon to flow by gravity back through the connection 7 and the check valve 10 and main discharge pipe 11, until the temperature in the tank 6 is lowered by radiation and another vacuum created, which closes the check valve 10. This vacuum again causes the water of condensation and accompanying vapor to flow from the pipe 4 of the heating system into the tank 6 until the vacuum is destroyed as before, whereupon the water flows out until the lowering of the temperature again creates another vacuum and the entire process is repeated. This cycle of operations will repeat itself automatically as long as the fire in the boiler creates sufficient vapor.

Referring now to the further detail shown in Figs. 1 and 2 whereby the operation of the device is periodic. It will be seen that I have provided a box or chamber 19, preferably cylindrical, communicating at its upper end with the steam inlet pipe 16 and provided with a siphon 20 whose shorter leg 21 passes through the top of the chamber 19 to near the bottom of said chamber, and whose longer leg terminates below said chamber in a thermostatic valve 22 of any recognized kind, which closes by expansion due to being heated by the steam when the latter reaches it, said valve preferably connecting by a pipe 23 with the main return pipe of the system. The pipe 17 extends down toward the bottom of the chamber 19, where it is provided with a float valve 24, herein conventionally shown as having its float 25 guided at 26, although it will be understood that any usual kind of a float valve may be provided.

Let it be supposed that the vacuum in the tank 6 has been broken from some cause, as the cessation of vapor, or the disturbance of the pressure through leaks which are usually contained in steam heating systems. Having properly started an initial vacuum in the system by the means already explained, the steam controlled valve 18 is thereafter left open so that the steam from the boiler can communicate with the tank 6 through the pipe 17. The steam at once closes the thermostatic valve 22, whereupon condensation of the steam gathers in the chamber 19 until it raises the float valve 24 and cuts off further entrance of steam through the pipe 17 into the tank 6. The condensation continues to rise in the chamber 19 until it fills said chamber and the pipes 16 and 20 to a sufficient height to start the siphon. By this time the thermostatic valve 22 has cooled sufficiently to open, so that the water of condensation from the chamber 19 is thereupon automatically siphoned from said chamber, allowing the float valve 24 to lower and open the direct steam passage into the tank 6 again. The steam is allowed to pass into the tank for a length of time governed by the amount of water withdrawn from the chamber 19 and the time required for condensation in said chamber to gather in sufficient quantity to raise the float valve 24 again to close the pipe 17. Thus the automatic siphon apparatus serves to time the flow of steam into the tank 6 and also to permit the automatic entrance of said steam to said tank at intermittent periods, which are determined or timed by the vertical adjustment of the pipes by means of their nuts 27, 28, 29. Each time that the steam from the pipe 17 into the tank 6 is cut off by the above mentioned action of the siphon valve, the steam in the tank 6 immediately condenses, as previously described, thereby drawing on the return end of the pipe 4 of the heating system and thereby accelerating, in the manner already previously described, proper circulation throughout the entire heating system. This action takes place periodically, and can be adjusted as desired, in the manner already explained.

In low-pressure house heating systems, the thermostatic valve 22 is connected to the return main as already stated, which entirely eliminates all loss of water from the system, so that a continuous vacuum is maintained throughout the entire heating system without any manual or mechanical assistance of any kind such as are usually found in connection with steam heating systems. For this reason, smaller piping is sufficient throughout the entire installation, and as the radiators and heating surfaces are kept at all times free from condensation and full of steam or vapor, it is obvious that my invention reduces the requisite size of the radiators and of the boiler or other steam generating device. If the operator desires, he may at any time open a drip valve or pet cock 30 in the bottom of the siphon valve, thereupon at once drawing off the water from the chamber 19 sufficiently to permit the steam to flow at once into the tank 6 as long as desired. By this means, the system may be quickened at any time.

The siphon valve is of particular advantage in connection with house-systems, where usually it is not desired to return the steam or condensation at high temperature, and said automatic siphon valve obviates the necessity of ever manually creating a vacuum in the system after said system is once started, for, after the system has been put in operation, as first described, the vacuum will be automatically created or restored at stated intervals whether required or not, and should the system at any time become cold through lack of fire, it will not be necessary manually to create a new vacuum, but only to refire the system, and thereupon the automatic siphon valve will create the vacuum without further assistance of any kind. This siphon valve feature of my invention is particularly useful in large systems where the condensation returns at a low temperature, as thereby all accumulations of water of condensation in the tank 6 are necessarily immediately discharged to the boiler or other steam generating device at predetermined intervals, when the siphon valve operates, and then, at each period, the vacuum in the tank 6 aids in compelling the water of condensation to flow from the radiating portion of the system back to the tank 6 and boiler at a sufficiently high temperature to obviate entirely the retention of any water of condensation.

The drip valve 30 constitutes means to enable the attendant to test the automatic siphon valve at any time to see if it is working as designed.

Having described my invention, what I claim as new and desire to secure by Letters Patent of the United States, is, 1. The combination with a steam generating device, steam radiating means, and a circulation system of pipes, all connected together in a steam heating system, of a vacuum generating tank connected with said system, and a siphon valve, comprising an auxiliary chamber having steam connection to the generating device and connection to said tank, a float valve within said chamber for automatically closing the connection to the tank by the rise in the chamber of condensation from said steam connection, and a siphon having its shorter leg terminating in said chamber below said float valve and means for automatically closing its longer leg when steam is present in the siphon.

2. In a steam heating system, the combination with a steam generating device, steam radiating means, and a circulation system of pipes, connected with said device and means, of a vacuum generating tank connected with said system, and a siphon valve, comprising an auxiliary chamber having steam connection to the generating device and connection to said tank, a float valve within said chamber for automatically closing the connection to the tank by the rise in the chamber of condensation from said steam connection, and a siphon having its shorter leg terminating in said chamber below said float valve, and the other leg provided with a thermostatic valve adapted to be closed by the presence of steam therein and opened by cooling.

3. In a steam heating system, the combination with a steam generating device, steam radiating means, and a circulation system of pipes, connecting said device and means, of a vacuum generating tank connected with said system, a siphon valve, comprising an auxiliary chamber having steam connection to the generating device and connection to said tank, a float valve within said chamber for automatically closing the connection to the tank by the rise in the chamber of condensation from said steam connection, and a siphon having its shorter leg terminating in said chamber below said float valve, and the other leg provided with a thermostatic valve adapted to be closed by the presence of steam therein and opened by cooling, and a connection from said thermostatic valve back to the generating device below the water line.

In testimony whereof, I have signed my name to this specification, in the presence of two subscribing witnesses.

WALLACE E. TILLINGHAST.

Witnesses:
MINNA S. TILLINGHAST,
F. DAVID WARD.